(12) United States Patent
Sidorovich Paradiso et al.

(10) Patent No.: US 11,965,463 B2
(45) Date of Patent: Apr. 23, 2024

(54) FLUID COOLER INSTALLATION AND METHOD FOR TURBOFAN ENGINE

(71) Applicant: PRATT & WHITNEY CANADA CORP., Longueuil (CA)

(72) Inventors: Ivan Sidorovich Paradiso, Toronto (CA); Daniel Alecu, Brampton (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 40 days.

(21) Appl. No.: 17/176,643

(22) Filed: Feb. 16, 2021

(65) Prior Publication Data

US 2022/0260018 A1     Aug. 18, 2022

(51) Int. Cl.
*F02C 7/18* (2006.01)
*F02C 7/14* (2006.01)

(52) U.S. Cl.
CPC ............... *F02C 7/18* (2013.01); *F02C 7/14* (2013.01); *F05D 2260/213* (2013.01); *F05D 2260/232* (2013.01); *F05D 2260/31* (2013.01); *F05D 2260/606* (2013.01); *F05D 2260/98* (2013.01)

(58) Field of Classification Search
CPC ...... F02C 7/18; F02C 9/18; F02C 7/14; F02C 7/16; F02C 7/185; F05D 2260/213; F05D 2260/232; F05D 2260/31; F05D 2260/606; F05D 2260/98; F28D 2021/0049; F28D 2021/0021
See application file for complete search history.

(56) References Cited

U.S. PATENT DOCUMENTS

| 9,932,905 | B2 | 4/2018 | Suciu et al. | |
| 10,450,952 | B2* | 10/2019 | Julien | F02K 3/06 |
| 2015/0275757 | A1* | 10/2015 | Turner | F02C 7/04 |
| | | | | 137/15.1 |

(Continued)

FOREIGN PATENT DOCUMENTS

| EP | 3330495 A1 | 6/2018 |
| FR | 2482196 A1 | 11/1981 |

OTHER PUBLICATIONS

Theoklis Nikolaidis et al., Exchange Rate Analysis for Ultra High Bypass Ratio Geared Turbofan Engines, MDPI, Appl. Sci., Nov. 9, 2020, pp. 1-20, http://www.mdpi.com/journal/applsci.

(Continued)

*Primary Examiner* — Topaz L. Elliott
*Assistant Examiner* — Ryan C Clark
(74) *Attorney, Agent, or Firm* — Norton Rose Fulbright Canada LLP

(57) ABSTRACT

A fluid cooler for installation in a bypass duct of a turbofan gas turbine engine and associated methods are provided. The fluid cooler includes an inlet duct, a heat exchanger and an outlet duct. The inlet duct includes an inlet protruding into the bypass duct to receive a portion of the bypass air into the inlet duct. The heat exchanger is in fluid communication with the inlet duct. The heat exchanger facilitates heat transfer between a fluid and the portion of bypass air received into the inlet duct. The heat exchanger defines a general flow direction for the portion of bypass air that is different from the main flow direction of bypass air inside the bypass duct. The outlet duct conveys the portion of bypass air from the heat exchanger back to the bypass duct.

8 Claims, 13 Drawing Sheets

(56) References Cited

U.S. PATENT DOCUMENTS

| | | | | |
|---|---|---|---|---|
| 2015/0361891 A1* | 12/2015 | Schwarz | ................. | F02C 3/107 |
| | | | | 60/39.83 |
| 2016/0017804 A1 | 1/2016 | Afrianto et al. | | |
| 2016/0108814 A1* | 4/2016 | Schmitz | .................... | F28F 7/02 |
| | | | | 60/39.511 |
| 2016/0222886 A1 | 8/2016 | Riehle et al. | | |
| 2018/0038243 A1* | 2/2018 | Rambo | ................. | F01D 17/145 |
| 2018/0149089 A1* | 5/2018 | Elder | ...................... | F02C 7/185 |
| 2018/0347468 A1* | 12/2018 | Caimano | ................... | F02C 7/12 |
| 2018/0356157 A1* | 12/2018 | Ferrier | ................. | F28D 1/0233 |
| 2019/0203613 A1* | 7/2019 | Sennoun | ................... | F02K 3/06 |
| 2019/0323429 A1* | 10/2019 | McGee | ..................... | F02C 7/25 |
| 2019/0360398 A1* | 11/2019 | Qiu | ........................... | F02C 3/06 |
| 2020/0040765 A1* | 2/2020 | Walsh | ..................... | F02C 7/125 |
| 2020/0088100 A1* | 3/2020 | Ingley | ...................... | F02C 3/13 |

OTHER PUBLICATIONS

European Patent Office, Communication re. partial European search report for European patent application No. 22156451.1, dated Jul. 7, 2022.

European Patent Office, Communication re. extended European search report for European patent application No. 22156451.1, dated Nov. 11, 2022.

* cited by examiner

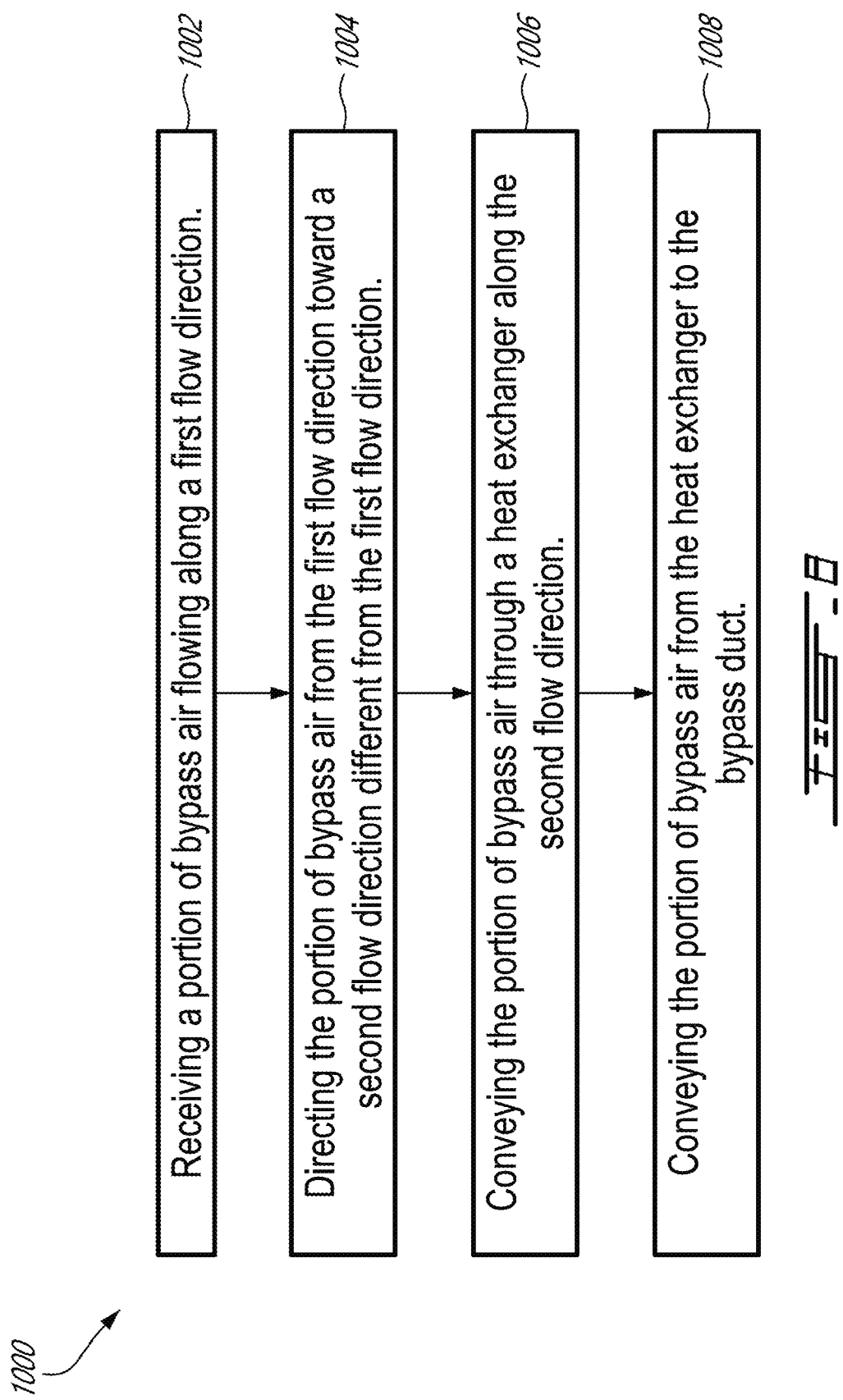

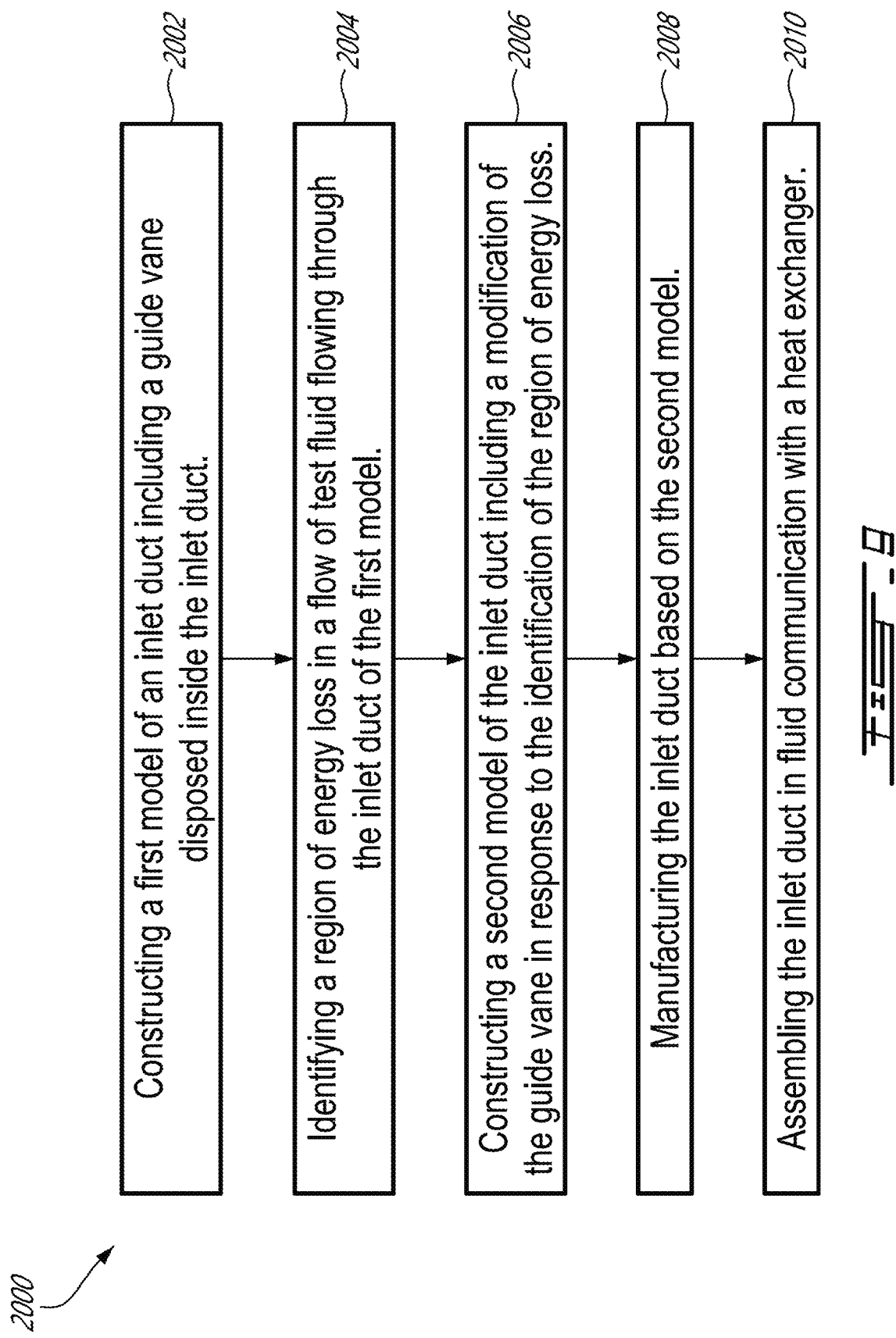

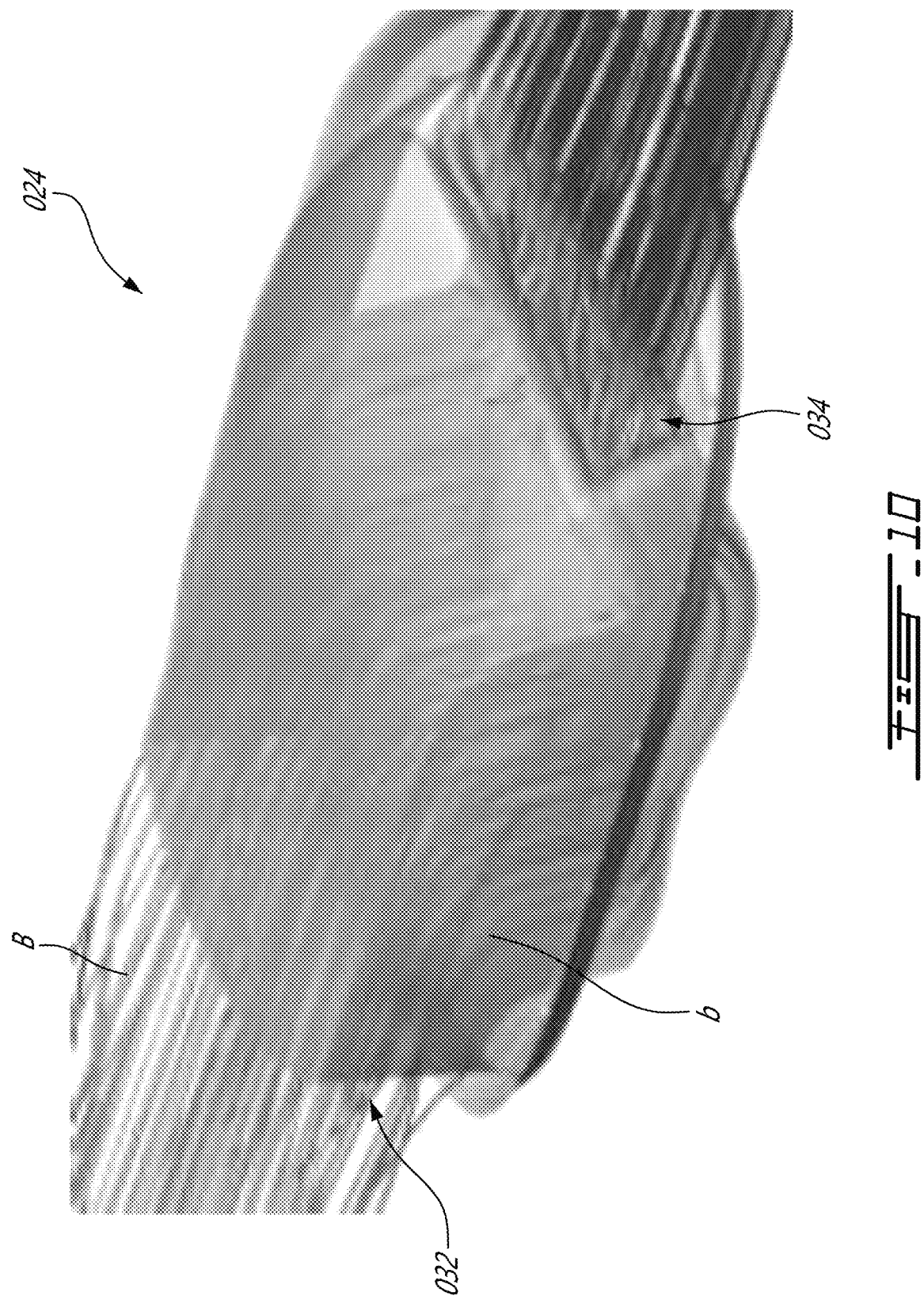

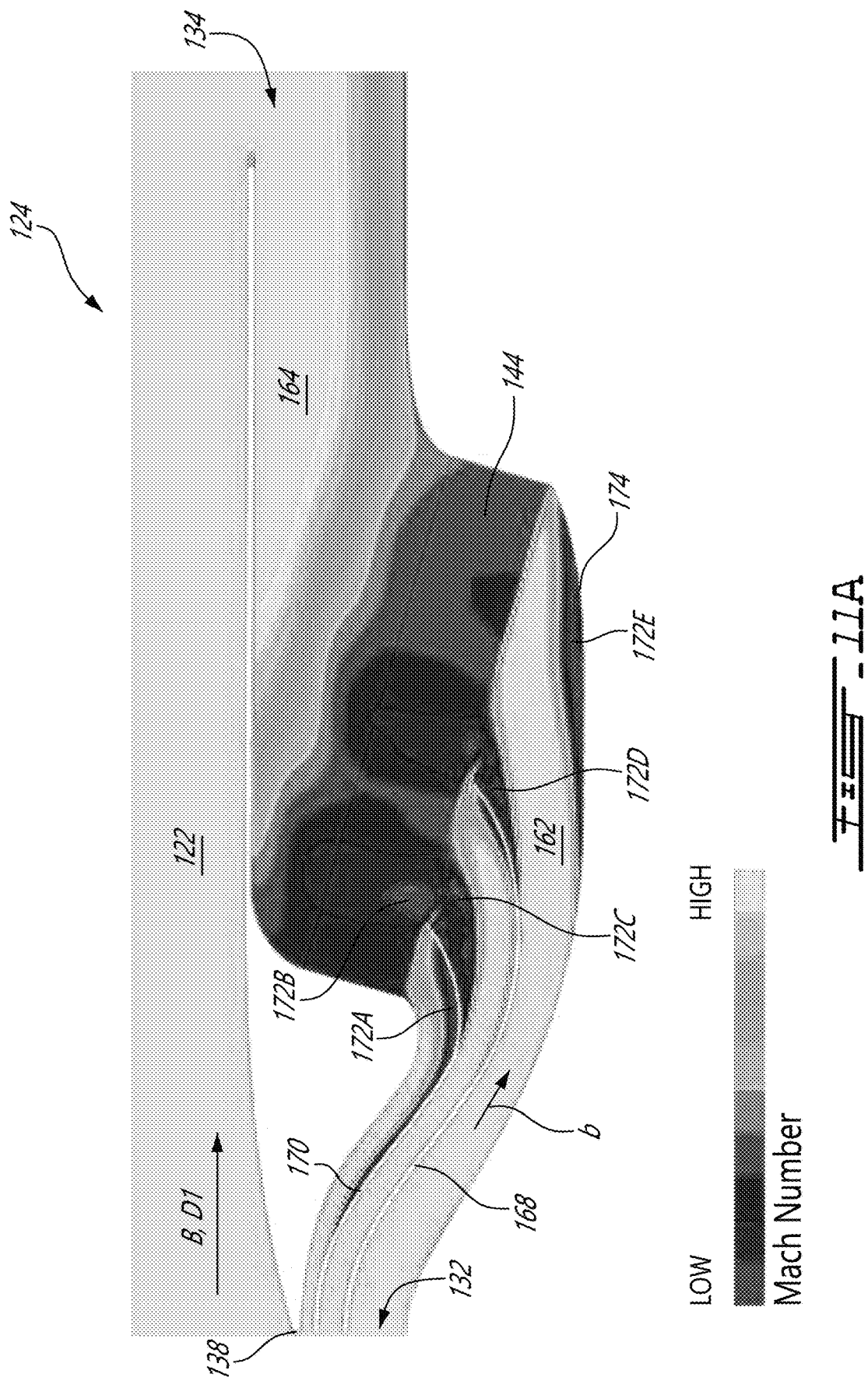

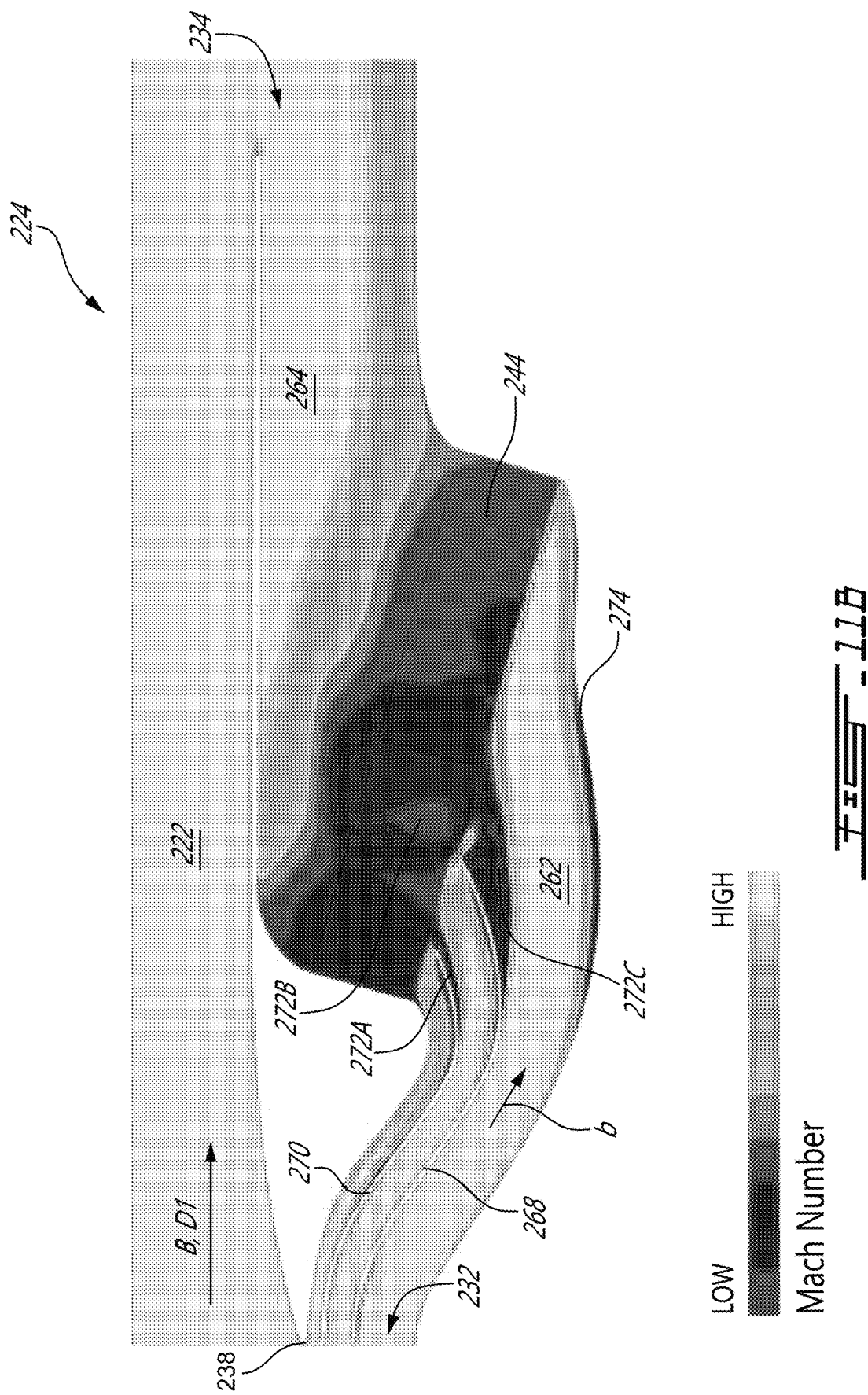

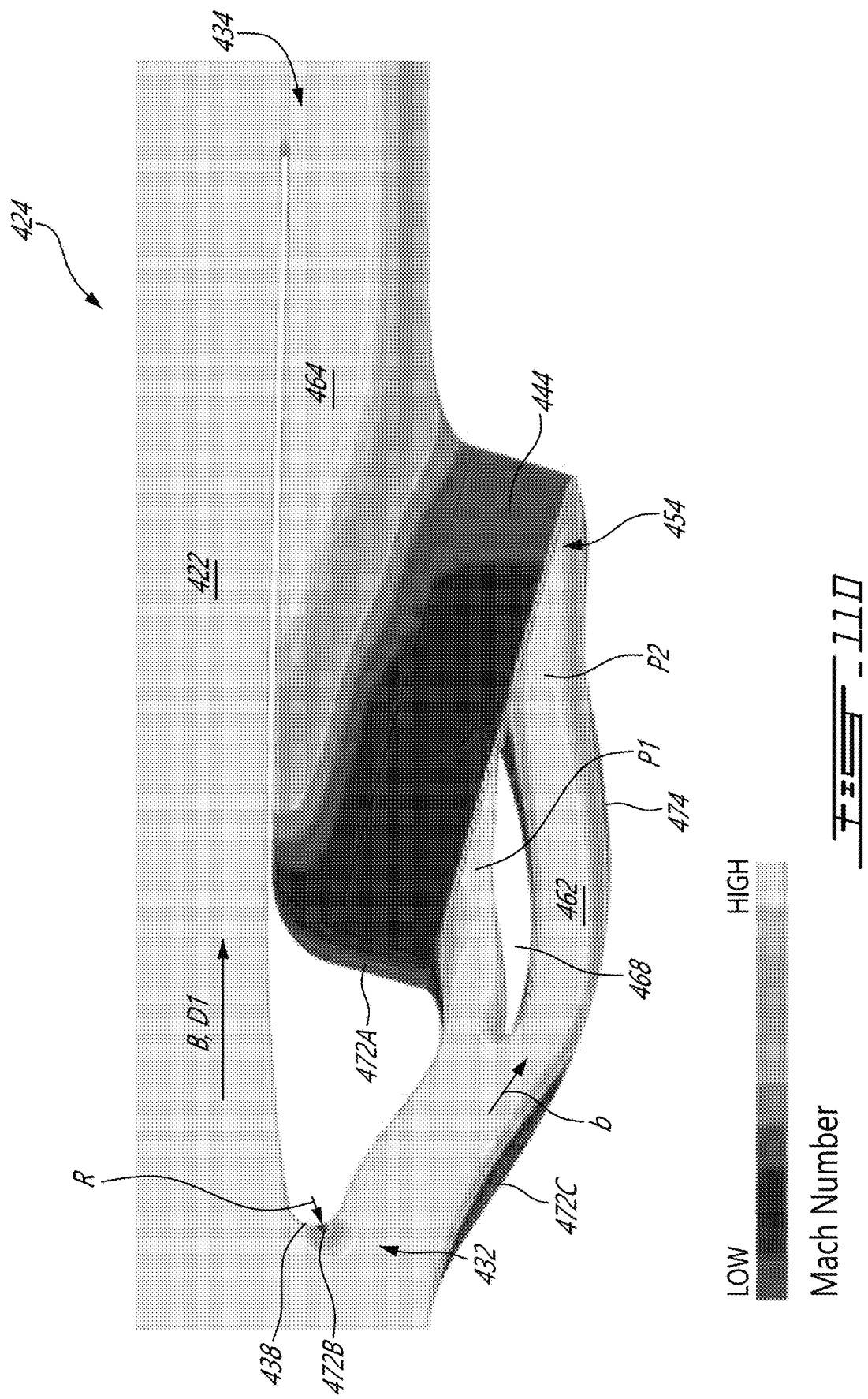

FLUID COOLER INSTALLATION AND METHOD FOR TURBOFAN ENGINE

TECHNICAL FIELD

The disclosure relates generally to gas turbine engines, and more particularly to fluid coolers in gas turbine engines.

BACKGROUND

Bypass air flowing in a bypass duct of a turbofan gas turbine engine can be a heat sink for other systems of the engine. However, installing a heat exchanger inside a bypass duct of a turbofan engine can negatively affect performance. For example, the presence of a heat exchanger in the bypass duct can disrupt the flow of bypass air and result in energy losses and a penalty in the specific fuel consumption of the engine. Improvement is desirable.

SUMMARY

In one aspect, the disclosure describes a turbofan gas turbine engine comprising:
  a bypass duct at least partially surrounding a core engine, the bypass duct defining a first general flow direction for bypass air flowing inside the bypass duct;
  a fan delivering the bypass air to the bypass duct and core air to the core engine; and
  a fluid cooler including:
    an inlet duct having an inlet protruding into the bypass duct and receiving a portion of the bypass air into the inlet duct;
    a heat exchanger in fluid communication with the inlet duct, the heat exchanger facilitating heat transfer between a fluid and the portion of bypass air received into the inlet duct, the heat exchanger defining a second general flow direction for the portion of bypass air through the heat exchanger, the second general flow direction being different from the first general flow direction defined by the bypass duct; and
    an outlet duct conveying the portion of bypass air from the heat exchanger to the bypass duct.

In another aspect, the disclosure describes a fluid cooler for installation in an opening formed in a shroud of a bypass duct of a turbofan gas turbine engine. The fluid cooler comprises:
  a mounting interface for attachment of the fluid cooler to the shroud of the bypass duct;
  an inlet duct having a ram air inlet disposed above the mounting interface for protruding into the bypass duct during use and receive a portion of the bypass air into the inlet duct;
  a heat exchanger in fluid communication with the inlet duct for facilitating heat transfer between a fluid and the portion of bypass air received into the inlet duct, at least a portion of the heat exchanger being disposed below the mounting interface to be disposed outside of the bypass duct during use; and
  an outlet duct for conveying the portion of bypass air from the heat exchanger to the bypass duct.

In a further aspect, the disclosure describes a method for cooling a fluid using bypass air flowing along a first flow direction inside a bypass duct of a turbofan gas turbine engine. The method comprises:
  receiving a portion of the bypass air flowing along the first flow direction;
  directing the portion of bypass air from the first flow direction toward a second flow direction different from the first flow direction;
  conveying the portion of bypass air through a heat exchanger along the second flow direction to facilitate heat transfer between the portion of bypass air and the fluid; and
  conveying the portion of bypass air from the heat exchanger to the bypass duct.

In a further aspect, the disclosure describes a method of manufacturing a fluid cooler. The fluid cooler includes an inlet duct extending along a nonlinear trajectory to direct a cooling fluid flowing in a first direction toward a different second direction through a heat exchanger. The method comprises:
  constructing a first model of the inlet duct, the first model including a guide vane disposed inside the inlet duct;
  identifying a region of energy loss in a flow of test fluid flowing through the inlet duct of the first model;
  constructing a second model of the inlet duct, the second model being based on the first model and including a modification of the guide vane from the first model in response to the identification of the region of energy loss;
  manufacturing the inlet duct based on the second model; and
  assembling the inlet duct in fluid communication with the heat exchanger.

Further details of these and other aspects of the subject matter of this application will be apparent from the detailed description included below and the drawings.

DESCRIPTION OF THE DRAWINGS

Reference is now made to the accompanying drawings, in which:

FIG. 8 is a flowchart illustrating a method for cooling a fluid using bypass air from a bypass duct of a turbofan gas turbine engine;

FIG. 9 is a flowchart illustrating a method of manufacturing a fluid cooler;

FIG. 10 is a tridimensional stream line plot illustrating the flow of cooling air through a baseline design of the fluid cooler of FIG. 2; and FIGS. 11A-11D are fluid velocity maps illustrating Mach number contours associated with different design iterations of the fluid cooler of FIG. 2.

DETAILED DESCRIPTION

The following disclosure describes fluid cooler installations and associated methods for turbofan gas turbine engines. In some embodiments, the fluid cooler installations and methods described herein may reduce energy losses in the flow of bypass air in bypass ducts of turbofan gas turbine engines compared to existing fluid cooler installations. For example, the fluid coolers described herein may permit heat exchangers to be oriented non-perpendicular (e.g., obliquely) to the main bypass air flow direction so that heat exchangers having more cooling capacity for a given frontal area (and associated drag penalty) may be used. In some embodiments, the configurations of fluid coolers described herein may also allow the cooling air to be routed from the main flow of bypass air to the heat exchanger and then returned to the main flow of bypass air in a relatively efficient manner to promote reduced energy losses.

The terms "attached" or "connected" may include both direct attachment/connection (in which two elements contact each other) and indirect attachment/connection (in which at least one additional element is located between the two elements).

The term "substantially" as used herein may be applied to modify any quantitative representation which could permissibly vary without resulting in a change in the basic function to which it is related.

Aspects of various embodiments are described through reference to the drawings.

Figure 1:
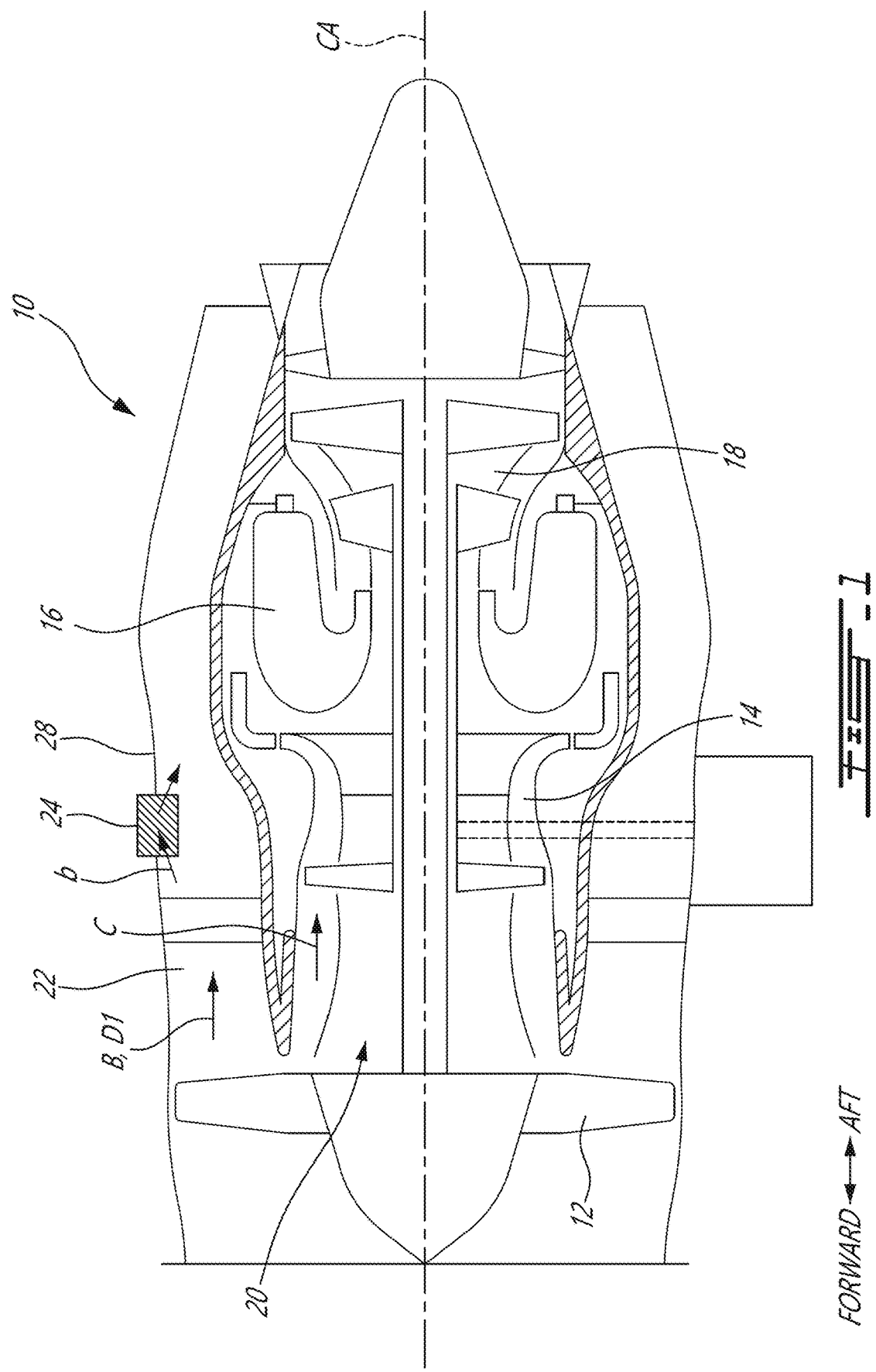
FIG. 1 shows a schematic axial cross-section view of a turbofan gas turbine engine including a fluid cooler as described herein.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Engine 10 may be suitable for use in aircraft applications. For example, engine 10 may be a turbofan gas turbine engine. Engine 10 may include core engine 20 and bypass duct 22 at least partially surrounding core engine 20. Core engine 20 may include compressor 14, combustor 16 and turbine section 18. Core engine 20 may define a core gas path in which core airflow C is received and conveyed. Bypass duct 22 may define a substantially annular passage around core engine 20 in which bypass airflow B is received and conveyed. Fan 12 may be disposed within an air inlet of engine 10 and deliver bypass airflow B to bypass duct 22 and may also deliver core airflow C to core engine 20. Engine 10 may have central axis CA, which may correspond to a rotation axis of fan 12 and/or of other (e.g., low-pressure and/or high-pressure) shaft(s) of engine 10. Central axis CA may also correspond to a central axis of annular bypass duct 22.

Engine 10 may include fluid cooler 24 using a portion of bypass airflow B, referenced herein as cooling airflow b, as a heat sink for cooling another fluid. In some embodiments, fluid cooler 24 may include an air-to-air heat exchanger where cooling airflow b is used to cool pressurized air (i.e., bleed air) extracted from compressor 14 before such pressurized air is used for another purpose such as in an environmental control system (ECS) of an aircraft to which engine 10 is mounted for example. In some embodiments, fluid cooler 24 may include an air-to-liquid heat exchanger where cooling airflow b is used to cool oil from a lubricating system of engine 10, or fuel. Cooling airflow b may be captured (e.g., as ram air) from the main bypass airflow B and conveyed through a heat exchanger of fluid cooler 24 where heat is transferred from the other fluid to cooling airflow b. After passing though the heat exchanger, cooling airflow b may be returned to the main bypass airflow B inside of bypass duct 22. The addition of heat to cooling airflow b may provide a performance benefit by adding energy to bypass airflow B and may compensate for some energy loss associated with directing cooling airflow b through fluid cooler 24. In some embodiments, a relatively small positive net thrust may be achieved in some situations where the heat load is elevated enough and at high enough flight altitudes with low air density.

FORWARD and AFT directions are indicated in FIG. 1 where the FORWARD direction corresponds generally to a direction of motion of the illustrated turbofan engine 10 during flight when mounted to an aircraft.

Figure 2:
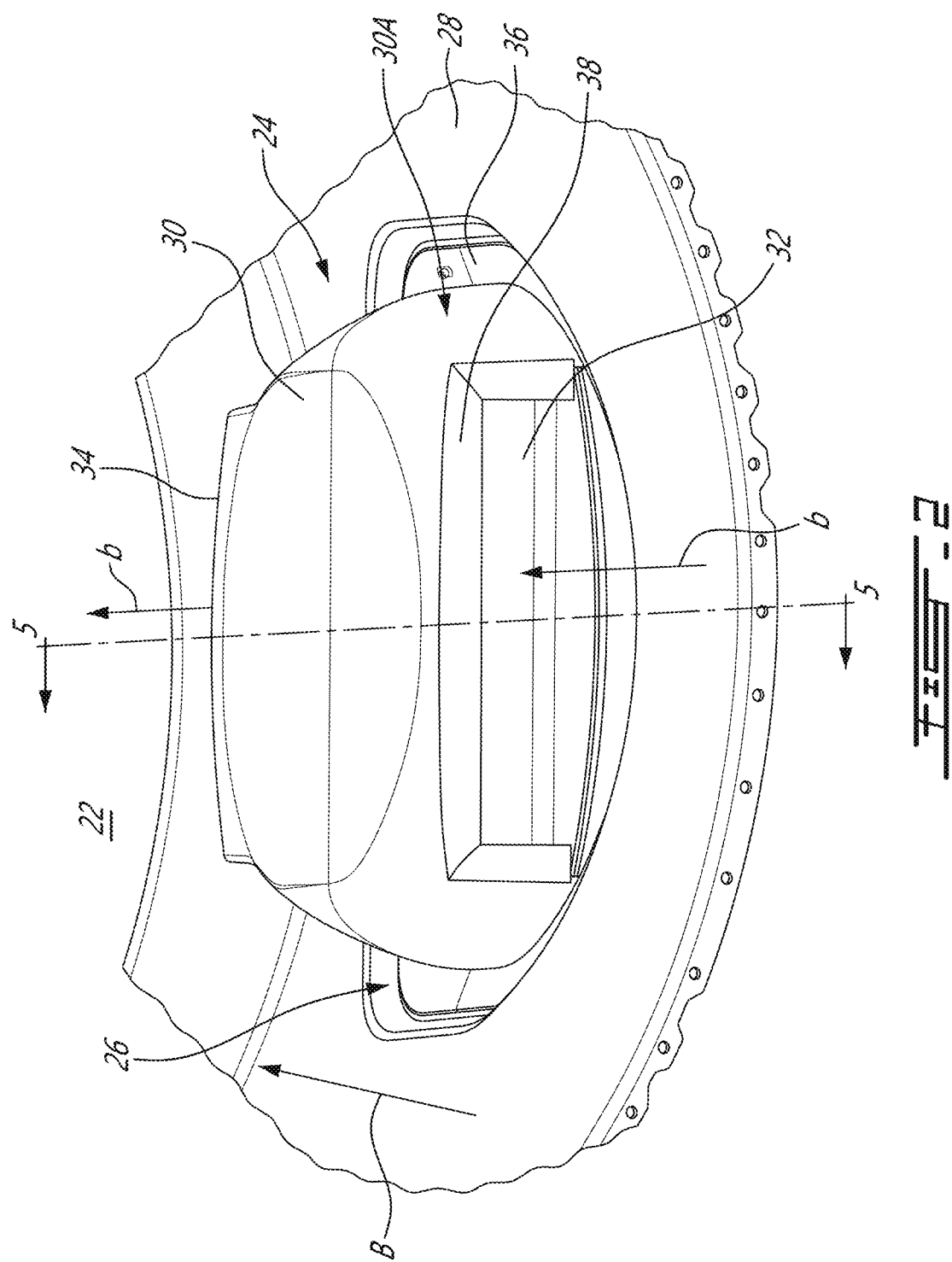
FIG. 2 is a perspective view of an exemplary fluid cooler installed in a bypass duct of the engine of FIG. 1 and showing an inlet of the fluid cooler.

FIG. 2 is a perspective view of an exemplary fluid cooler 24 installed in bypass duct 22 of engine 10. Fluid cooler 24 may be installed in opening 26 formed in shroud 28 of bypass duct 22. Shroud 28 may be a radially-outer or a radially-inner shroud of bypass duct 22. Accordingly, shroud 28 may define a radially-outer or a radially-inner boundary of bypass duct 22. In various embodiments, a portion of fluid cooler 24 may be disposed (i.e., submerged, protrude) inside of bypass duct 22 and another portion of fluid cooler 24 may be disposed outside of bypass duct 22. The portion of fluid cooler 24 shown in FIG. 2 may be disposed (i.e., submerged, protrude) inside of bypass duct 22.

Fluid cooler 24 may include housing 30 in which at least part of a heat exchanger may be disposed. Submerged portion 30A of housing 30 disposed (i.e., submerged) inside of bypass duct 22 may include an aerodynamic fairing that is intended for reduced drag created in bypass airflow B by way of housing 30 protruding into bypass duct 22. Fluid cooler 24 may include inlet 32 disposed on a forward side of housing 30 and permitting cooling airflow b (i.e., a portion of bypass airflow B) to be received into inlet 32 as ram air and used by the heat exchanger to cool another fluid. Housing 30 may also define inlet lip 38 at least partially surrounding inlet 32. Fluid cooler 24 may include outlet 34 disposed on an aft side of housing 30 and permitting cooling airflow b to be released from fluid cooler 24 after picking up heat from the other fluid via the heat exchanger, and discharged back into bypass duct 22. In some embodiments, the size (e.g., cross-sectional area) of inlet 32 may be selected to be smaller than outlet 34 due to the increase in temperature of cooling air b that happens in fluid cooler 24. The relative sizing of inlet 32 and outlet 34 may facilitate the profiling of housing 30 to hinder flow detachment around housing 30.

Figure 5:
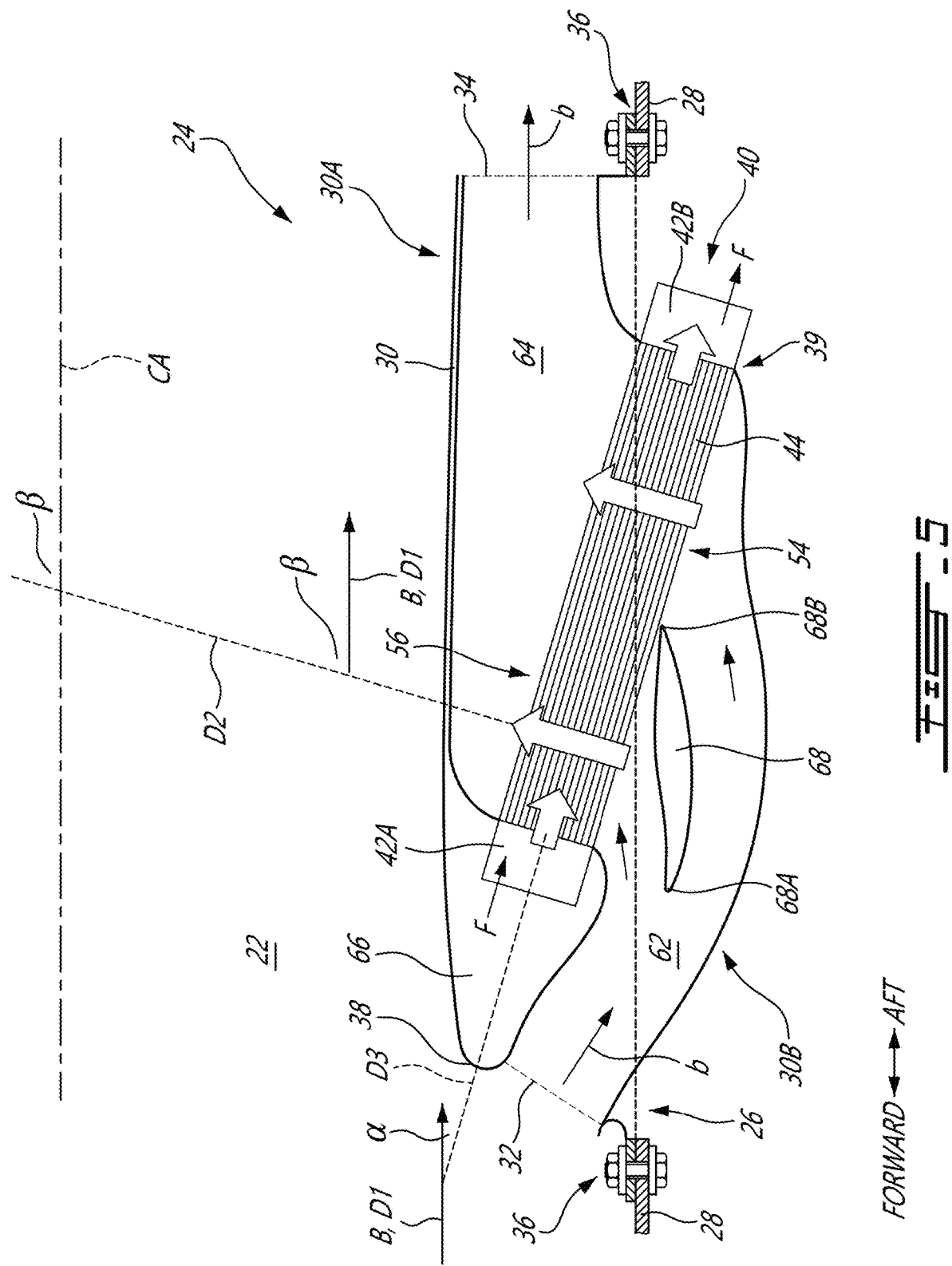
FIG. 5 is a schematic cross-sectional view of the fluid cooler of FIG. 2 taken along line 5-5 in FIG. 2.
Figure 6:
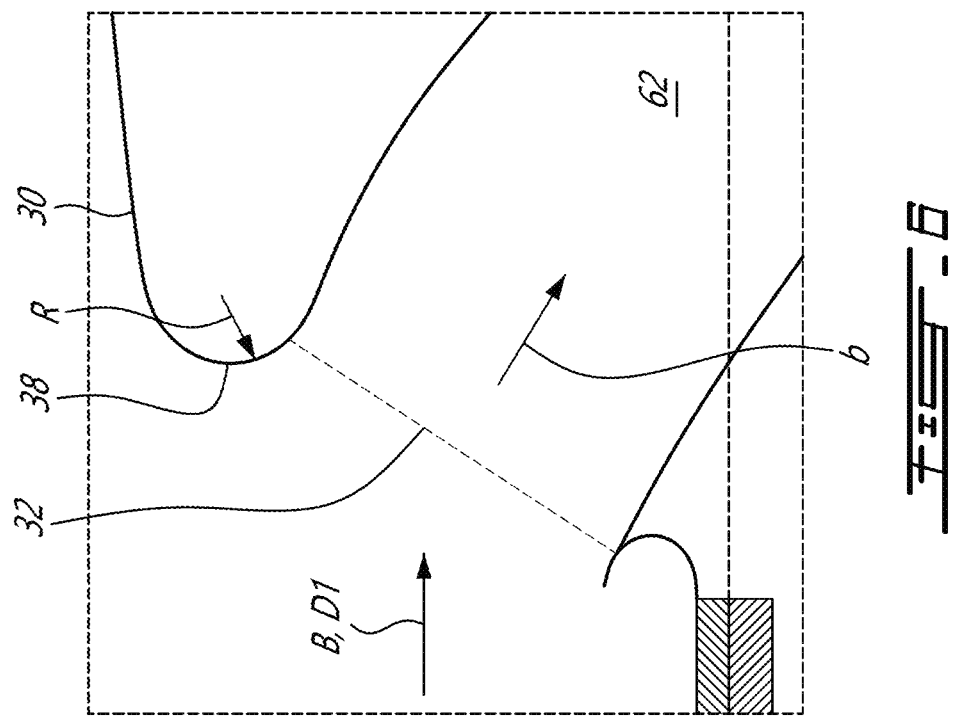
FIG. 6 is an enlarged cross-sectional view of an exemplary inlet of the fluid cooler of FIG. 2.

Fluid cooler 24 may include mounting interface 36 for direct or indirect attachment of fluid cooler 24 to shroud 28 of bypass duct 22. In some embodiments, mounting interface 36 may be attached to a portion of shroud 28 that is recessed relative to a main portion of shroud 28. Various types of mounting interfaces 36 may suitable. As shown in FIG. 2 as an example, mounting interface 36 may include one or more flanges that are attached to or integrally formed with housing 30 and that extend outwardly from housing 30. The flange(s) may overlap and be engaged with a portion of shroud 28 surrounding opening 26 to define a lap joint therebetween. The flange(s) may extend completely or partially around fluid cooler 24 and may facilitate the establishment of a sealed connection (e.g., via a suitable gasket) between housing 30 and shroud 28. The flange(s) may also permit fluid cooler 24 to be releasably attached to shroud 28 via one or more fasteners such as bolts as shown in FIGS. 5 and 6. Mounting interface 36 may substantially conform to a (e.g., flat, single-curvature, double-curvature) shape of a counterpart portion of shroud 28. Alternatively or in addition, mounting interface 36 may include a shoulder surface formed in housing 30 for engagement with a portion of shroud 28 around opening 26.

Part(s) of fluid cooler 24 that are disposed above mounting interface 36 in relation to FIG. 2 may protrude into bypass duct 22. For example, inlet 32, outlet 34 and part of submerged portion 30A of housing 30 may protrude into bypass duct 22. Part(s) of fluid cooler 24 that are disposed below mounting interface 36 may be disposed outside of bypass duct 22 and may not contribute to the overall frontal area of fluid cooler 24 perpendicular to bypass airflow B. Having part(s) of fluid cooler 24 disposed outside of bypass duct 22 may also facilitate the connection of servicing lines for cooled fluid F with the heat exchanger.

Figure 3:
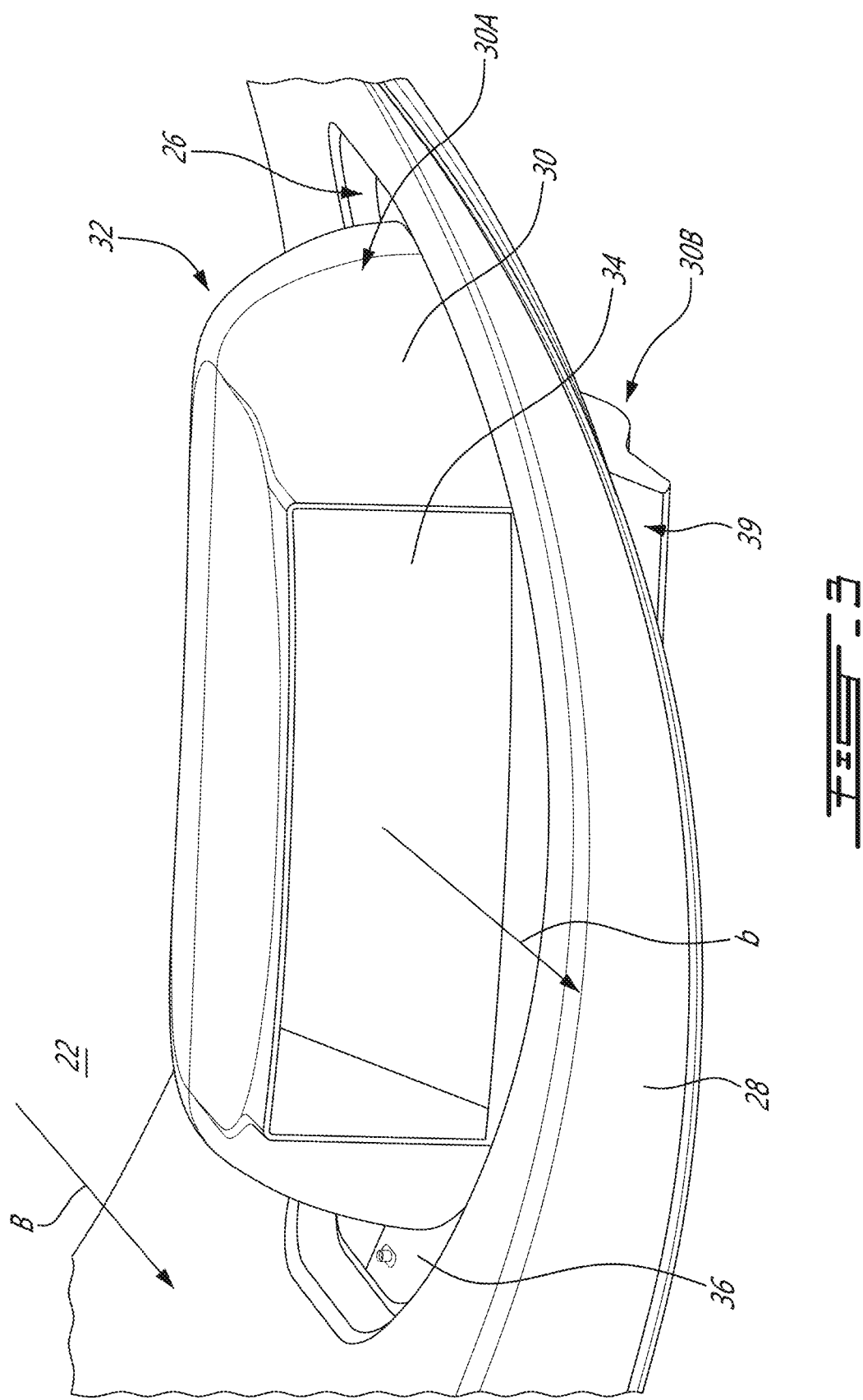
FIG. 3 is another perspective view of a housing of the fluid cooler of FIG. 2 installed in the bypass duct of the engine of FIG. 1 and showing an outlet of the fluid cooler.

FIG. 3 is a perspective view of housing 30 of fluid cooler 24 installed in bypass duct 22. FIG. 3 shows an aft side of housing 30 with outlet 34 formed therein. Housing 30 may include aperture 39 allowing a heat exchanger as described further below to be inserted into housing 30. Housing 30 is shown in FIG. 3 with the heat exchanger removed therefrom. Housing 30 may include submerged (e.g., upper) housing portion 30A that is disposed above mounting interface 36, protrudes into bypass duct 22 and is thereby submerged into bypass airflow B. Housing 30 may also include concealed (e.g., lower) housing portion 30B that is disposed below mounting interface 36 and outside of bypass duct 22.

Figure 4:
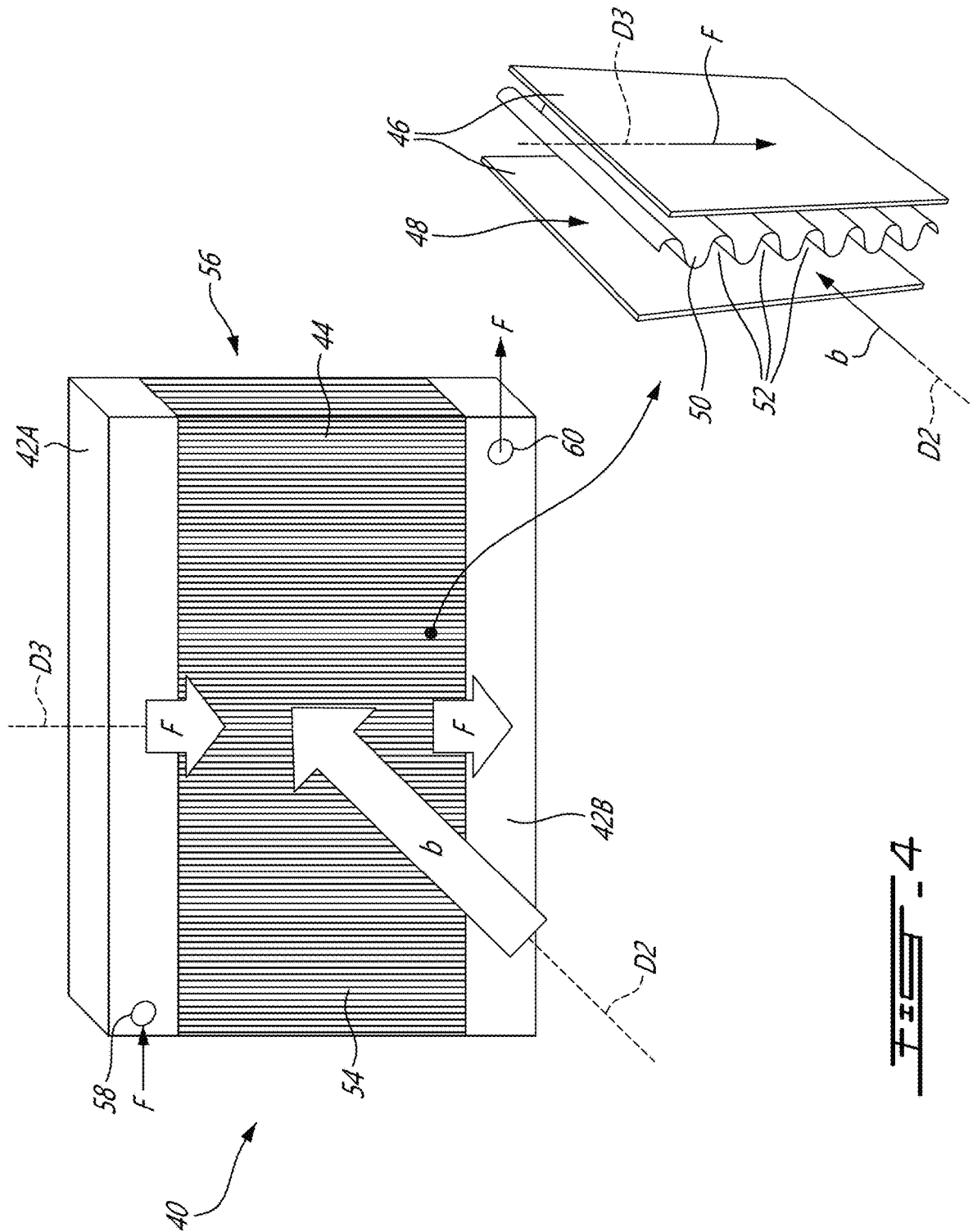
FIG. 4 is a schematic perspective view of an exemplary heat exchanger of the fluid cooler of FIG. 2.

FIG. 4 is a schematic perspective view of an exemplary heat exchanger 40 of fluid cooler 24. It is understood that various types of (e.g., air-to-air, air-to-liquid) heat exchangers may be suitable for use in fluid cooler 24. Heat exchanger 40 may include an automotive type radiator. Heat exchanger 40 may include a plate-fin heat exchanger for example. Heat exchanger 40 may include header (e.g., manifold) tanks 42A, 42B that are fluidly connected together via core 44 defining a plurality of narrow passageways to provide a relatively high surface area for heat transfer between the two fluids relative to volume.

An inset in FIG. 4 shows an exploded perspective view of an exemplary construction of core 44 having a plate-fin configuration. Core 44 may include substantially parallel parting plates 46 separated by finned chamber 48 to transfer heat between fluids. Heat transfer fin 50 may be disposed between parting plates 46 and define a plurality of passages 52 for one of the fluids. Sides of finned chamber 48 may be sealed by side bars/walls that are not shown in the inset. Layers of parting plates 46 and heat transfer fin 50 stacked together may define a plurality of finned chambers 48 that each convey the first or the second fluid in an alternating arrangement. Heat transfer fin 50 in adjacent finned chambers 48 may be oriented at orientations providing passages 52 that allow for crossflow, counterflow, cross-counterflow or parallel flow configurations.

Core 44 may define cooling air entrance 54 for cooling air b and cooling air exit 56 for cooling air b. Cooling air entrance 54 and cooling air exit 56 may be substantially planar and parallel in some embodiments. Cooling air b may be conveyed from cooling air entrance 54 to cooling air exit 56 substantially along cooling airflow direction D2 defined by passages 52 which may be substantially parallel. Header tanks 42A, 42B may define cooled fluid entrance 58 and cooled fluid exit 60 for cooled fluid F (e.g., air, oil, fuel) that is cooled by cooling air b. Cooled fluid F may be conveyed between header tanks 42A, 42B across core 44 substantially along cooled fluid flow direction D3 defined by parting plates 46 of heat exchanger 40 which may be substantially parallel. Cooling airflow direction D2 and cooled fluid flow direction D3 may be substantially perpendicular to each other.

FIG. 5 is a schematic cross-sectional view of fluid cooler 24 of FIG. 2 taken along line 5-5 in FIG. 2. Bypass duct 22 may define a general bypass flow direction D1 for bypass airflow B flowing inside bypass duct 22. Bypass flow direction D1 may correspond to the main (i.e., primary) fluid motion inside of bypass duct 22. In some embodiments and/or locations within bypass duct 22, bypass flow direction D1 may be substantially parallel (e.g., axial relative to) to central axis CA of engine 10.

Fluid cooler 24 may include inlet duct 62 having inlet 32 disposed above mounting interface 36 and protruding into bypass duct 22 to receive a portion of bypass airflow B into inlet duct 62. Inlet 32 may be configured (e.g., as a scoop) for receiving ram air into inlet duct 62. Heat exchanger 40 may be in fluid communication with inlet duct 62 for facilitating heat transfer between cooled fluid F and cooling fluid b received into inlet duct 62. Fluid cooler 24 may include outlet duct 64 having outlet 34 for conveying cooling air b from heat exchanger 40 back to bypass duct 22 after cooling air b has picked up heat from cooled fluid F. Outlet 34 may also be disposed above mounting interface 36 and protrude into bypass duct 22.

Inlet duct 62 and outlet duct 64 may both direct cooling air b along a nonlinear trajectory to accommodate the oblique or other orientation of heat exchanger 40 relative to bypass airflow direction D1 and/or relative to central axis CA. For example, cooling airflow direction D2 defined by heat exchanger 40 may be oriented at angle β relative to bypass airflow direction D1 and/or to central axis CA. In some embodiments, angle β may be between 70° and 76°. Cooling fluid flow direction D3 defined by heat exchanger 40 may be oriented at a relatively shallow angle α relative to bypass airflow direction D1 and/or to central axis CA. In some embodiments, angle α may be between 14° and 20° for example. In some embodiments, angle α may be between 0° and 20° for example. In some embodiments, core 44 may have a generally cuboid (i.e., box-shaped) configuration as illustrated in FIG. 4 and directions D2 and D3 may be used to define an orientation of core 44 relative to another frame of reference. It is understood that other orientations of core 44 may be suitable.

The oblique orientation of core 44 relative to bypass airflow B may allow for a reduced frontal area of heat exchanger 40 as seen by bypass airflow B for a given cooling capacity compared to having core 44 oriented perpendicular to bypass airflow B. In some embodiments, this may facilitate the use of a core 44 having cooling air entrance 54 and cooling air exit 56 of greater areas (e.g., wider and/or taller) to provide greater cooling capacity compared to other installations. In some embodiments, this may also facilitate the use of a core 44 having a smaller thickness (i.e., the distance between cooling air entrance 54 and cooling air exit 56) to provide a shorter path for cooling airflow b across core 44, and consequently reduce the flow resistance and associated energy loss across core 44 compared to other installations. In some embodiments, the configuration of fluid cooler 24 may allow for scaling up cooling capacity with reduced increase in frontal area of fluid cooler 24.

Fluid cooler 24 may also be configured so that at least a portion heat exchanger 40 is disposed below mounting interface 36 and outside of the bypass duct 22 during use. Accordingly, the portion of heater exchanger 40 disposed outside of bypass duct 22 may not contribute to the effective frontal area of fluid cooler 24 inside of bypass duct 22. In some embodiments, a portion of heat exchanger 40 may protrude inside of bypass duct 22 (e.g., above mounting interface 36) and another portion of heat exchanger 40 may be disposed outside of bypass duct 22 (e.g., below mounting interface 36).

The locations of header tanks 42A, 42B relative to core 44 in the orientation of heat exchanger 40 shown in FIG. 5 may also promote a smaller overall frontal area of fluid cooler 24 inside of bypass duct 22. For example, header tanks 42A, 42B may be respectively disposed forward and aft of core 44 where cooled fluid flow direction D3 has a greater vector component that is along bypass airflow direction D1 as opposed to transverse thereto. Compared to having header tanks 42A, 42B disposed on opposite lateral sides of core 44 and directly contributing to the overall width of fluid cooler 24 across bypass airflow B, the forward-aft locations of header tanks 42A, 42B may benefit from the oblique orientation of heat exchanger 40 to promote a smaller frontal area. In some embodiments, forward header tank 42A may be disposed above mounting interface 36 and protrude in bypass duct 22. In some embodiments, aft header tank 42B may be disposed below mounting interface 36 and outside of bypass duct 22.

A forward portion of housing 30 may define inlet lip 38 associated with inlet 32. Inlet lip 38 may be exposed to the incoming bypass airflow B. Housing 30 may define a hollow internal cavity 66 behind inlet lip 38. In other words, an inner side of a wall of housing 30 defining inlet lip 38 may face internal cavity 66. Forward header tank 42A may be disposed inside cavity 66 and be in thermal communication with the wall of housing 30 defining inlet lip 38. Some of the heat from cooled fluid F supplied to forward header tank 42A may be released inside of cavity 66 and transferred to the wall of housing 30 defining inlet lip 38 to provide icing protection (e.g., anti-icing, de-icing) of inlet lip 38 in some embodiments.

Inlet duct 62 may extend along a nonlinear (e.g., curved) trajectory to direct cooling airflow b received at inlet 32 generally along bypass airflow direction D1 toward cooling airflow direction D2 through heat exchanger 40. In some embodiments, inlet duct 62 may have a S-shaped trajectory. In some embodiments, inlet duct 62 may include one or more guide vanes 68 disposed therein to interact with cooling airflow b and assist with the directing of cooling airflow b toward cooling airflow direction D2 through core 44. Guide vane 68 may extend laterally relative to central axis CA. For example, leading edge 68A of guide vane 68 may extend transversely to central axis CA and also transversely to a radial direction relative to central axis CA. In other words, leading edge 68A may extend substantially perpendicular to the page in FIG. 5.

Outlet duct 64 may extend along a nonlinear (e.g., curved) trajectory to direct cooling airflow b discharged from cooling air exit 56 of heat exchanger 40 along cooling airflow direction D2 toward bypass airflow direction D1. Outlet 34 may also protrude into bypass duct 22 and facilitate a return of cooling airflow b to bypass airflow B with reduced flow disruptions to bypass airflow B.

FIG. 6 is an enlarged axial cross-sectional view of inlet 32 of fluid cooler 24 as shown in FIG. 5 in a plane parallel to and containing central axis CA shown in FIG. 5. FIG. 6 also shows an axial cross-sectional profile of inlet lip 38 associated with inlet 32. In some embodiments, inlet lip 38 may have a rounded (i.e., blunt, non-sharp) axial cross-sectional profile. In some embodiments, the rounded shape of inlet lip 38 may allow for a stagnation point to remain attached to inlet lip 38 at various positions on inlet lip 38 and for a range of flow conditions. In some embodiments, this may allow the aerodynamic continuity to be maintained throughout a range of flow conditions on a portion of the wall of housing 30 defining inlet lip 38 and extending toward inlet duct 62 and away from inlet duct 62. In some non-limiting embodiments, inlet lip 38 may have radius R selected so that inlet lip 38 may define a (e.g., non-sharp) bullnose edge.

Figure 7:
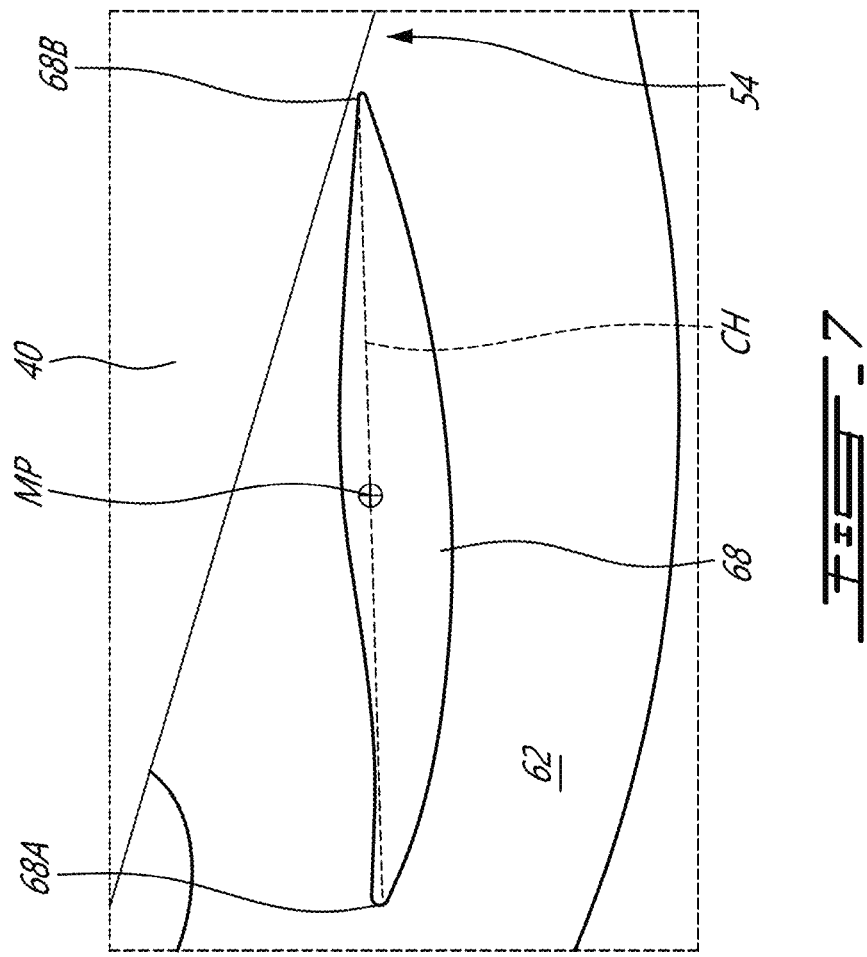
FIG. 7 is an enlarged cross-sectional view of an exemplary guide vane of the fluid cooler of FIG. 2.

FIG. 7 is an enlarged cross-sectional view of part of inlet duct 62 including guide vane 68. In some embodiments, guide vane 68 may be disposed closer to heat exchanger 40 than to inlet 32. Guide vane 68 may have chord line CH extending between leading edge 68A and trailing edge 68B of guide vane 68. In some embodiments, mid point MP of chord line CH may be disposed closer to cooling air entrance 54 of heat exchanger 40 than to inlet 32 of inlet duct 62.

FIG. 8 is a flowchart illustrating method 1000 for cooling cooled fluid F using bypass air from bypass duct 22 of engine 10. Method 1000 may be conducted using fluid cooler 24 described herein or using another fluid cooler. Aspects of fluid cooler 24 may be included in method 1000. Aspects of method 1000 may also be combined with aspects of other methods described herein. Method 1000 may include:

receiving a portion of bypass air (e.g., cooling airflow b) flowing along a first flow direction (e.g., bypass flow direction D1)(see block 1002);
 directing the portion of bypass air from the first flow direction toward a second flow direction (e.g., cooling airflow direction D2) different from the first flow direction (see block 1004);
 conveying the portion of bypass air through heat exchanger 40 along the second flow direction to facilitate heat transfer between the portion of bypass air and the cooled fluid F (see block 1006); and
 conveying the portion of bypass air from heat exchanger 40 to bypass duct 22 (see block 1008).

In some embodiments, conveying cooling airflow b from heat exchanger 40 to bypass duct 22 may include directing cooling airflow b from cooling airflow direction D2 back toward bypass airflow direction D1.

In some embodiments, cooling airflow b may be received into inlet 32 defined by inlet lip 38 and icing protection for inlet lip 38 may be provided using heat from cooled fluid F (e.g., via forward header tank 42A).

FIG. 9 is a flowchart illustrating method 2000 of manufacturing a fluid cooler. Method 2000 may be used for manufacturing fluid cooler 24 described herein and aspects of fluid cooler 24 may be included in method 2000. Aspects of method 2000 may also be combined with aspects of other methods described herein. For example, the manufactured fluid cooler 24 may include inlet duct 32 extending along a nonlinear trajectory to direct a fluid flowing in a first direction toward a second direction through heat exchanger 40 where the second direction is different from the first direction. Aspects of method 2000 are described in reference to FIGS. 10 and 11A-11D. Method 2000 may include:

constructing first model 124 (shown in FIG. 11A) including inlet duct 162, first model 124 including guide vane 168 or 170 disposed inside inlet duct 162 (see block 2002);
 identifying region(s) 172A-172D of energy loss in a flow of test fluid (e.g., air) flowing through inlet duct 162 (see block 2004);
 constructing second model 224, 324 or 424 (shown in FIGS. 11B-11D) including inlet duct 262, 362 or 462, second model 224, 324 or 424 being based on first model 124 and including a modification of guide vane 168 or 170 from first model 124 in response to the identification of region(s) 172A-172D of energy loss (see block 2006);

manufacturing inlet duct 62 based on inlet duct 262, 362 or 462 of second model 224, 324 or 424 (see block 2008); and assembling inlet duct 62 in fluid communication with heat exchanger 40 (see block 2010).

FIG. 10 is a tridimensional stream line plot illustrating the flow of cooling airflow b through a baseline model 024 of fluid cooler 24 of FIG. 2 that does not include guide vane 68. Baseline model 024 may include inlet 032 and outlet 034. Bypass airflow B may be received in inlet 032, flow through baseline model 024 and exit outlet 034. Bypass airflow B and cooling airflow b are illustrated by way of stream lines that may be determined based on the expected flow (e.g., boundary) conditions and the geometry of the passage(s) provided inside of model 024. The stream lines may be a family of curves that are instantaneously tangent to the velocity vector of the flow. The stream lines show the direction in which a massless fluid element will travel at different moments in time. The stream lines may be determined by modelling and simulation using computational fluid dynamics (CFD) and model 024 in digital form (e.g., a data structure). Accordingly, methods disclosed herein (or part(s) thereof) could be performed using one or more computers using suitable CFD software. Alternatively or in addition, the stream lines may be determined empirically using model 024 in physical form and wind tunnel testing for example.

Figure 11C:
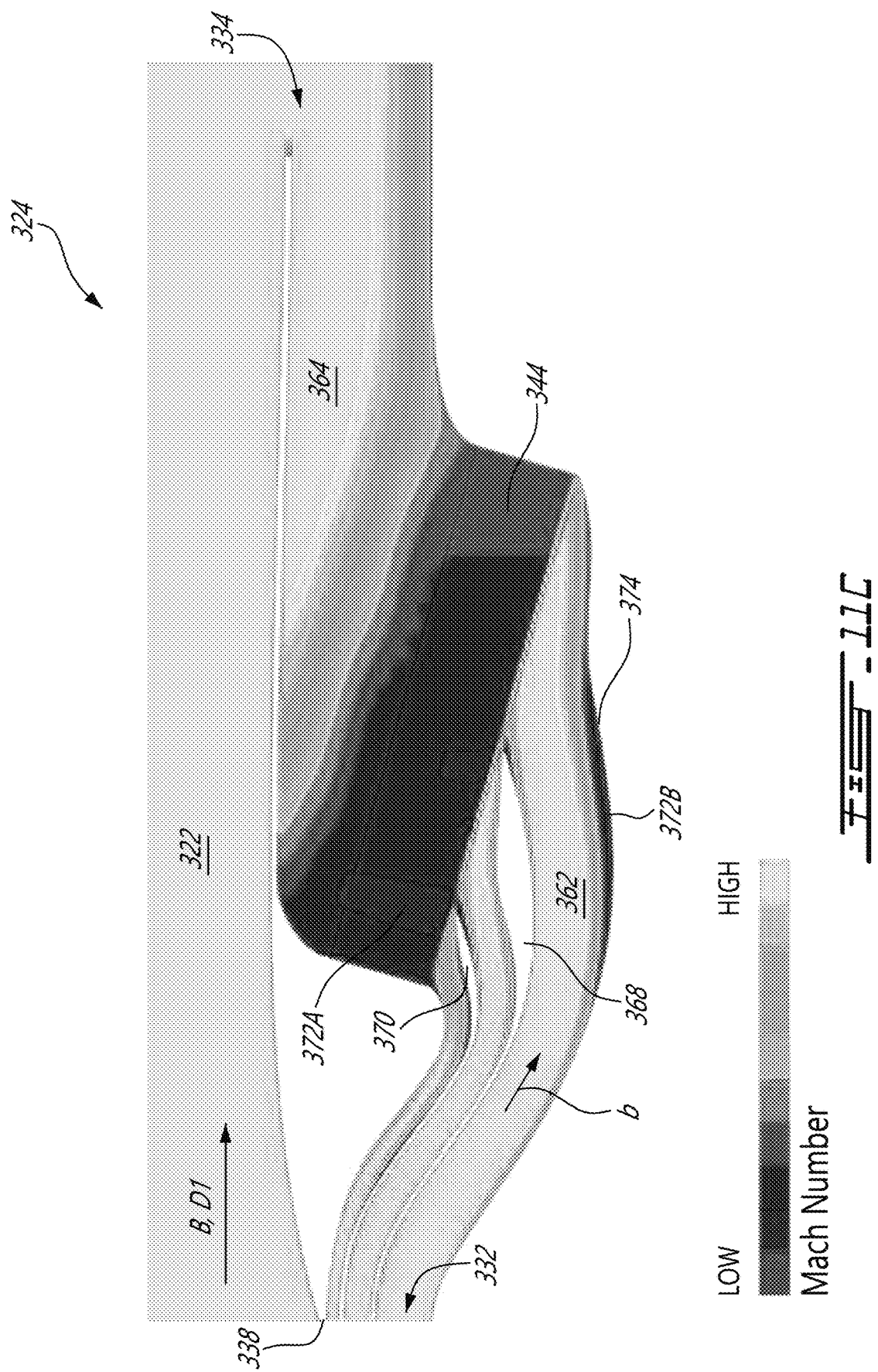

FIGS. 11A-11D are fluid velocity maps illustrating Mach number contours associated with different design iterations (i.e., models 124, 224, 324 and 424) of fluid cooler 24. The fluid velocity maps are taken as axial cross-sections of the type shown in FIG. 5. Reference numerals used in FIG. 11A used to represent elements previously described are incremented by 100. Reference numerals used in FIGS. 11B-11D used to represent elements shown in FIG. 11A are progressively incremented by 100 with each of FIGS. 11B-11D. In reference to FIG. 11A, regions 172A-172D of relatively low Mach number may be represent secondary flows developed as a result of static pressure differentials. For example, regions 172A-172D may include recirculation zones. Regions 172A-172D may be indicative of energy loss in cooling airflow b. The fluid velocity maps of FIGS. 11A-11D may be determined by modelling and simulation using CFD and models 124, 224, 324 and 424 in digital form. Alternatively, fluid velocity maps may be determined empirically using models 124, 224, 324 and 424 in physical form and wind tunnel testing for example.

In reference to FIG. 11A, first model 124 may include bypass airflow B flowing in bypass duct 122 and cooling airflow b flowing in the fluid cooler. Model 124 may includes inlet 132, inlet lip 138, inlet duct 162, heat exchanger core 144, outlet duct 164 and outlet 134. Inlet duct 162 may also includes one or more guide vanes 168, 170. Guide vanes 168, 170 may each be relatively thin walls (e.g., fins) extending substantially the entire length of inlet duct 162. As an initial design iteration, guide vanes 168, 170 may be shaped to follow and extend along respective estimated/anticipated stream lines such as those shown in FIG. 10 for example. The lengths of guide vanes 168, 170 of first model 124 may correspond to at least a majority of an entire length of the applicable respective stream lines along inlet duct 162. Inlet lip 138 may be relatively sharp (i.e., zero or small radius of curvature). First model 124 may also include regions 172A-172E of energy loss in cooling airflow b. Inlet duct 162 may include outer wall 174.

As shown in FIGS. 11A-11D, outlet duct 164 may be configured so that at least some cooling airflow b exiting outlet 134 closely matches the velocity and flow direction of bypass airflow B when cooling airflow b is recombined with bypass airflow B.

FIGS. 11B-11D respectively show three design iterations in order and subsequent to first model 124. It is understood that fewer or additional design iterations may be performed to achieve the desired level of optimization. Single or multiple design changes may be made with each iteration so that some iterations may be added or combined together so that fewer iterations and models are required. The different design iterations represented by models 124, 224, 324 and 424 may be considered examples of embodiments with varying degree of optimization but suitable for use in fluid cooler 24 in some situations.

FIG. 11B shows second model 224 which may represent a design iteration subsequent to first model 124. Second model 224 may be based on first model 124 and may include one or more design modifications that improve (e.g., reduce energy loss in) the flow conditions of cooling airflow b relative to first model 124. Second model 224 may include bypass airflow B flowing in bypass duct 222 and cooling airflow b flowing in the fluid cooler. Second model 224 may includes inlet 232, inlet lip 238, inlet duct 262, heat exchanger core 244, outlet duct 264, outlet 234 and guide vanes 268, 270. Inlet duct 262 may include outer wall 274. Second model 224 may also include regions 272A-272C of energy loss in cooling airflow b.

Second model 224 may include a modification of guide vane 168 and/or 170 from first model 124 in response to the identification of regions 172A-172E of energy loss in first model 124. For example, the shape and/or position of guide vanes 168, 170 may be modified. As an example, region 172A of energy loss identified in first model 124 may be adjacent guide vane 170, and a modification of guide vane 170 may include a positional shift of part of guide vane 170 toward region 172A of energy loss to produce guide vane 270. As another example, a modification of guide vane 168 may include a positional shift of part of guide vane 168 toward region 172C of energy loss to produce guide vane 268. For example, one or both guide vanes 168, 170 may be adjusted to at least partially fill-in regions 172C and/or 272A, and to substantially follow (e.g., be tangent to) the desired natural stream lines within 0° to 5° divergence from the natural stream lines.

Second model 224 may include modifications to various parts of first model 124. As another example, the shape and/or position of outer wall 174 of inlet duct 162 may be altered. Region 172E of energy loss identified in first model 124 may be adjacent outer wall 174 of inlet duct 162. Second model 224 may include a positional shift of outer wall 174 toward region 172E of energy loss to produce outer wall 274. For example, outer wall 174 may be adjusted to at least partially fill-in region 172E, and to substantially follow (e.g., be tangent to) the desired natural stream lines within 0° to 5° divergence from the natural stream lines.

FIG. 11C shows third model 324 which may represent a design iteration subsequent to first model 124 and/or second model 224. Third model 324 may include one or more design modifications that further improve (e.g., reduce energy loss in) the flow conditions of cooling airflow b. Third model 324 may include bypass airflow B flowing in bypass duct 322 and cooling airflow b flowing in the fluid cooler. Third model 324 may includes inlet 332, inlet lip 338, inlet duct 362, heat exchanger core 344, outlet duct 364, outlet 334, guide vanes 368, 370. Inlet duct 362 may include outer wall 374. Third model 324 may also include regions 272A-272E of energy loss in cooling airflow b.

Third model 324 may include a modification of guide vanes 268 and/or 270 from second model 224 in response to the identification of regions 272A-272C of energy loss in second model 224. For example, the thickness of one or both guide vanes 268, 270 may be increased to produce guide vanes 368, 370. For example, guide vanes 268, 270 may be thickened to at least partially fill-in regions 272C and 272A respectively, tangent to the desired stream lines within 0° to 5° of divergence.

FIG. 11D shows fourth model 424 which may represent a design iteration subsequent to first model 124, second model 224 or third model 324. Fourth model 424 may include one or more design modifications that further improve (e.g., reduce energy loss in) the flow conditions of cooling airflow b. Fourth model 424 may include bypass airflow B flowing in bypass duct 422 and cooling airflow b flowing in the fluid cooler. Fourth model 424 may includes inlet 432, inlet lip 438, inlet duct 462, heat exchanger core 444, outlet duct 464, outlet 434, guide vanes 468, 470. Inlet duct 462 may include outer wall 474. Fourth model 424 may also include regions 472A-472C of energy loss in cooling airflow b.

Fourth model 424 may include a removal of guide vane 370 relative to third model 324. Fourth model 424 may include a reduction in length of guide vane 368 and a rounding of the leading edge of guide vane 368 to produce guide vane 468. The single guide vane 468 may provide two separate flow paths P1 and P2 to heat exchanger core 444. In some embodiments, one or both paths P1, P2 may have an expanding cross-sectional area toward core 444 so that some diffusion of cooling airflow b may be provided immediately upstream of core 444. Such diffusion of cooling airflow b may be beneficial in creating a pressure and promoting spreading of cooling airflow b across cooling air entrance 454 of core 444.

Fourth model 424 may include a rounding of inlet lip 438. For example, cross-sectional radius R of inlet lip 438 may be increased to be greater than in one or more previous design iterations. Regions 472C of energy loss at inlet lip 438 may represent a stagnation point that is attached to inlet lip 438 at the operating conditions represented in fourth model 424.

In reference to FIGS. 2, 3 and 3, inlet duct 62, outlet duct 64 and any other parts of housing 30 shown in FIGS. 2, 3 and 3 may be manufactured according to any one of models 124, 224, 324, 424 or any combinations thereof. Housing 30 may be manufactured out of metallic and/or fiber reinforced polymeric material for example. In some embodiments, housing 30 may be made of sheet metal (e.g., aluminum alloy, titanium alloy or steel) using suitable metal forming techniques including die forming. In some embodiments, multiple pieces of sheet metal may be formed and subsequently assembled (e.g., fastened and/or welded) together. In some embodiments, part(s) of housing 30 may be made from a metallic material using additive manufacturing.

In some embodiments, part(s) of housing 30 may be made from a suitable fiber-reinforced composite material. Part(s) of housing 30 may, for example, be made by injection molding using a polymeric material reinforced with relatively short and randomly oriented carbon fibers. Part(s) of housing 30 may, for example, be made by 3D printing using a polymeric material reinforced with relatively short and randomly oriented carbon fibers.

In some embodiments, heat exchanger 40 may be assembled with housing 30 after the manufacturing of housing 30. For example, heat exchanger 40 may be inserted into housing 30 via aperture 39 shown in FIGS. 3 and 5 so that core 44 becomes in fluid communication with inlet duct 62 and outlet duct 64. In cases where housing 30 is made of multiple pieces, heat exchanger 40 and associated plumbing may be assembled with pieces of housing 30 as the pieces of housing 30 are assembled together.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

What is claimed is:

1. A turbofan gas turbine engine comprising:
   a bypass duct at least partially surrounding a core engine, the bypass duct defining a first general flow direction for bypass air flowing inside the bypass duct;
   a fan delivering the bypass air to the bypass duct and core air to the core engine; and
   a fluid cooler including:
      an inlet duct having an inlet protruding into the bypass duct and receiving a portion of the bypass air into the inlet duct;
      a heat exchanger in fluid communication with the inlet duct, the heat exchanger facilitating heat transfer between a fluid and the portion of bypass air received into the inlet duct, the heat exchanger defining a second general flow direction for the portion of bypass air through the heat exchanger, the second general flow direction being different from the first general flow direction defined by the bypass duct;
      a guide vane disposed inside the inlet duct and interacting with the portion of bypass air inside the inlet duct, the guide vane having a leading edge, a trailing edge and a chord line extending from the leading edge to the trailing edge, a mid point of the chord line being disposed closer to the heat exchanger than to the inlet of the inlet duct, the guide vane having a non-uniform thickness between the leading edge and the mid point of the chord line; and
      an outlet duct conveying the portion of bypass air from the heat exchanger to the bypass duct;
   wherein:
      a first portion of the heat exchanger protrudes inside the bypass duct;
      a second portion of the heat exchanger is disposed outside of the bypass duct;
      the first portion of the heat exchanger is forward of the second portion of the heat exchanger relative to the first general flow direction for bypass air flowing inside the bypass duct; and
      the guide vane defines two separate flow paths to the heat exchanger for the portion of bypass air received into the inlet duct, the two separate flow paths having expanding cross-sectional areas toward the heat exchanger to provide diffusion of the portion of bypass air received into the inlet duct upstream of the heat exchanger.

2. The turbofan gas turbine engine as defined in claim 1, wherein:
   the fan has a rotation axis; and the leading edge of the guide vane is transverse to the rotation axis and transverse to a radial direction relative to the rotation axis.

3. The turbofan gas turbine engine as defined in claim 1, wherein:
the fluid cooler includes a housing;
a portion of the housing protrudes into the bypass duct;
the portion of the housing defines an inlet lip associated with the inlet and an internal cavity behind the inlet lip; and
the heat exchanger includes a header tank disposed inside the internal cavity.

4. The turbofan gas turbine engine as defined in claim 1, wherein:
the heat exchanger includes a first header tank and a second header tank fluidly connected via a core;
the first header tank is disposed forward of the core relative to the first general flow direction; and
the second header tank is disposed aft of the core relative to the first general flow direction.

5. The turbofan gas turbine engine as defined in claim 1, wherein the outlet duct protrudes into the bypass duct.

6. The turbofan gas turbine engine as defined in claim 1, wherein the second general flow direction defined by the heat exchanger is oriented 70° to 76° of the first general flow direction defined by the bypass duct.

7. The turbofan gas turbine engine as defined in claim 1, wherein the inlet is configured to direct the portion of bypass air along a S-shaped trajectory.

8. The turbofan gas turbine engine as defined in claim 1, wherein the second general flow direction defined by the heat exchanger extends toward the bypass duct.

\* \* \* \* \*